(12) United States Patent
Wolf et al.

(10) Patent No.: US 7,834,984 B2
(45) Date of Patent: Nov. 16, 2010

(54) DEVICE FOR OPTICAL DISTANCE MEASUREMENT

(75) Inventors: Peter Wolf, Leinfelden-Echterdingen (DE); Uwe Skultety-Betz, Leinfelden-Echterdingen (DE); Joerg Stierle, Waldenbuch (DE); Bjoern Haase, Stuttgart (DE); Kai Renz, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 42 days.

(21) Appl. No.: 12/293,861

(22) PCT Filed: Feb. 12, 2007

(86) PCT No.: PCT/EP2007/051325
§ 371 (c)(1),
(2), (4) Date: Jan. 8, 2009

(87) PCT Pub. No.: WO2007/107413
PCT Pub. Date: Sep. 27, 2007

(65) Prior Publication Data
US 2009/0185158 A1  Jul. 23, 2009

(30) Foreign Application Priority Data
Mar. 23, 2006 (DE) .................. 10 2006 013 292

(51) Int. Cl.
*G01C 3/08* (2006.01)
(52) U.S. Cl. ............... 356/4.01; 356/5.01; 356/5.1; 356/28
(58) Field of Classification Search ....... 356/3.01–3.15, 356/4.01–4.1, 5.01–5.15, 6–22
See application file for complete search history.

(56) References Cited

U.S. PATENT DOCUMENTS

| | | | |
|---|---|---|---|
| 5,006,721 A | 4/1991 | Cameron | |
| 5,354,983 A * | 10/1994 | Juds et al. | 250/222.1 |
| 6,133,988 A | 10/2000 | Rheme et al. | |
| 6,603,534 B2 | 8/2003 | Seifert et al. | |
| 6,833,909 B2 * | 12/2004 | Schmidt et al. | 356/4.01 |
| 7,221,435 B2 | 5/2007 | Stierle | |
| 2001/0050764 A1 | 12/2001 | Shirai | |

(Continued)

FOREIGN PATENT DOCUMENTS

DE      100 51 302      4/2002

(Continued)

*Primary Examiner*—Thomas H Tarcza
*Assistant Examiner*—Luke D Ratcliffe
(74) *Attorney, Agent, or Firm*—Michael J. Striker

(57) ABSTRACT

The invention relates to a device for optically measuring distance, in particular a hand-held device, comprising an transmitter unit (12) which is provided with a light source (17, 18) for transmitting optical measuring radiation (13, 20, 22) to a target object (15), and a capturing unit (14) which is arranged at a distance on the optical axis (38) of the transmitter unit (14). Said capturing unit (14) comprises at least one optical detector (54) comprising a detection surface (66) for capturing optical radiation (16, 49, 50) reflected by the target object (15). According to the invention, the detection surface (66) of the detector (54) comprises an optical near range element (68), whose optically active surface (72, 74) is elongated in the direction (61) of the radiation shift for receding target object separations (48) and expands or has at least one essentially constant extension.

10 Claims, 4 Drawing Sheets

U.S. PATENT DOCUMENTS

2007/0211329 A1    9/2007    Haase et al.

FOREIGN PATENT DOCUMENTS

| DE | 101 20 763 | 11/2002 |
| DE | 101 30 763 | 1/2003 |
| DE | 102 39 435 | 3/2004 |
| WO | 2006/024566 | 3/2006 |

* cited by examiner

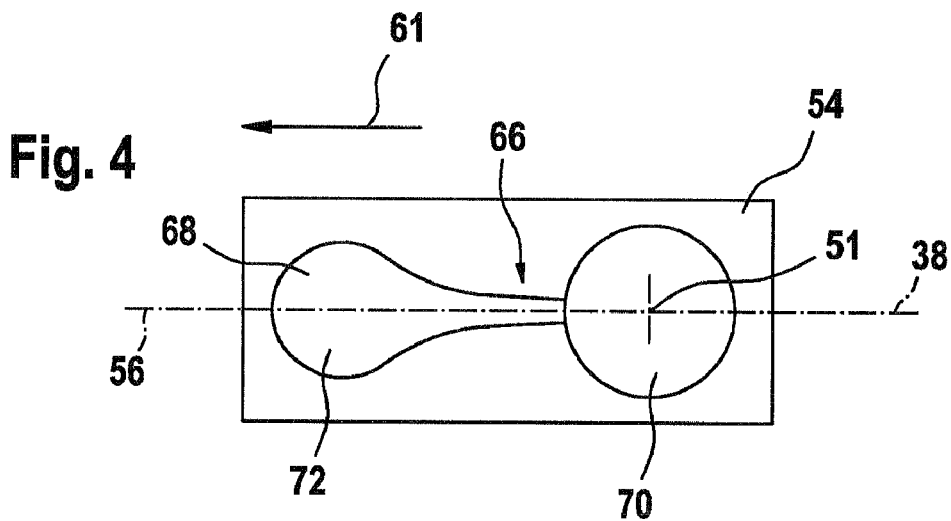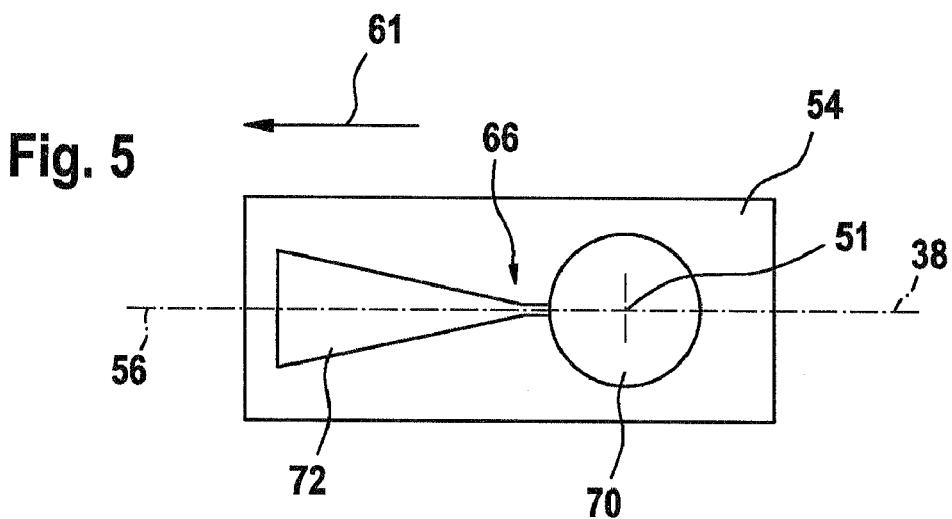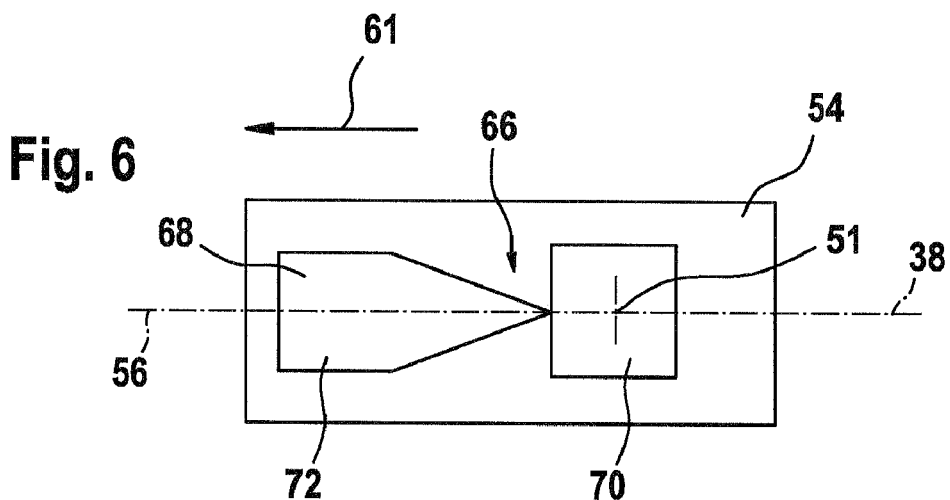

DEVICE FOR OPTICAL DISTANCE MEASUREMENT

BACKGROUND OF THE INVENTION

The present invention is directed to a device for optically measuring distance.

Optical distance-measuring devices as such have been known for a long time, and they are now sold commercially in large quantities. These devices emit a modulated light beam that is directed toward the surface of a desired target object whose distance from the device is to be determined. A portion of the returning light that has been reflected or scattered by the target object is detected by the device, and it is used to determine the distance in question.

The application range of distance-measuring devices of this type generally ranges from a few centimeters to several hundred meters.

Depending on the paths to be measured and the reflectance of the target object, different requirements result for the light source, the quality of the measurement beam, and the detector.

The optical distance-measuring devices known from the related art basically belong to two categories, depending on the configuration of the transmission and reception channels present in the device.

In one category, there are devices with which the transmission channel is located a certain distance away from the reception channel, so that the optical axes extend in parallel with each other but at a distance away from each other. The other category includes monoaxial measuring devices with which the reception channel extends coaxially with the transmission channel.

The former, biaxial measurement systems have the advantage that a complex beam-splitting system is not required to select the returning measurement signal, thereby also enabling, e.g., optical crosstalk from the transmission path directly into the reception path to be suppressed to a greater extent.

Biaxial distance-measuring devices have the disadvantage, however, that detection problems may arise when close-range distance measurements are performed, due to a parallax. In this case, the image of the target object on the detector surface—the image being located unambiguously on the detector even when target distances are great—moves increasingly further away from the optical axis of the reception path as the measurement distance decreases, and the beam cross-section in the detector plane changes markedly.

As a result, the measurement signal that is detected may approach zero in the close range of detection, i.e., when the distance between the target object and the measuring device is short, if no further measures are taken in the device.

Although measuring devices of this type may be optimized for a certain distance range, this requires that the measuring range that is actually accessible to the measuring device be limited substantially.

Publication DE 10 130 763 A1 makes known a device for optically measuring distance over a large measuring range that includes a transmission unit with a light source for emitting modulated, optical radiation toward a target object, and with which the receiving unit that includes an optical detector located in this measuring device—which serves to receive the optical radiation returning from the target object—is located on a reception axis, which is located at a distance away from the optical axis. The active, photosensitive surface of the detector of the reception unit described in DE 10 130 763 A1 tapers in the direction of a beam displacement for decreasing target object distances that results due to a parallax of the returning measurement radiation.

Publication DE 10 051 302 A1 makes known a laser distance-measuring device for close range and long-range that includes a special receiver with a transmission channel and a reception channel. The transmission channel is composed of a transmission lens, in whose focal point a laser light source is located. The reception channel is composed of a reception lens, in whose focal plane a receiver system is located. The optical axes of the transmission lens and the reception lens extend in parallel with each other for a finite distance. The receiver system of the laser distance-measuring device described in DE 100 51 302 A1 is a photodiode chip system with at least two active photodiode surfaces located on a straight line that intersects the optical axes of the transmission and reception lens of this device.

The object of the present invention is to ensure—based on a device for optically measuring distance according to the related art—that the most constant reception signal possible may be measured across the largest possible measuring range.

SUMMARY OF THE INVENTION

With biaxial optical distance-measuring systems that are usually adjusted for large measurement distances, as the measurement distances become shorter, the returning measurement signal "wanders" laterally in the detector plane, and the measurement beam becomes defocussed. This results in an increased beam diameter of the measurement signal in the detection plane. This results in a decrease of the measurement signal intensity per surface, which, depending on the design of the measuring device, is only partially compensated for by the greater measurement signal intensity that exists due to the shorter distance.

The inventive device for optically measuring distance includes a transmission unit with a light source for emitting optical radiation, in particular modulated optical measurement radiation, and a reception unit, which is located at a distance away from the optical axis of this transmission unit and includes at least one optical detector. In particular, the shape of the photosensitive, active surface of the inventive detector is advantageously selected such that a signal with a sufficient signal intensity is present on the detector surface even at close range.

To this end, the detector of the reception unit and/or the photosensitive surface of this detector includes an optical close-range element for detecting measurement radiation, in particular from close range, whose optically active surface expands, at least partially, perpendicularly to the direction of a beam displacement for decreasing target object distances, or it expands in an at least essentially constant manner.

The optically active surface of the detector is also elongated in the direction of a beam displacement for decreasing target-object distances, i.e., the active, photosensitive surface has a greater extension in the direction of beam displacement than it does in the direction perpendicular thereto. In this manner, it may be ensured that, even when the measurement signal "wanders away" due to a parallax that is inherent in the system, a sufficient amount of measurement signal always strikes the active detector surface, thereby ensuring that a good signal-to-noise ratio is attained when a measurement is carried out using the inventive device.

Compared with the devices for optically measuring distance that are known from the related art, the inventive device has the advantage, in particular, that the path traveled by the optical radiation is not influenced by the means for eliminating the parallax problem. As such, the means for eliminating the parallax problem do not negatively affect the distance measurement.

In an advantageous embodiment, the detector of the reception unit of the device includes a close-range element, whose optically active surface expands in the direction of a beam displacement for decreasing target-object distances. As a result, the effect of the defocussing, which occurs at short target-object distances, may be compensated for. This defocussing, which results in an increased beam diameter of the measurement signal in the detection plane, normally means that the measurement signal intensity per surface decreases, thereby resulting in a weaker detectable received signal.

Given that, in the inventive device, the photosensitive surface of the detector increases in the direction of a beam displacement as the target-object distances decrease, and this surface expands, particularly in the direction lateral to the direction of beam displacement, the effective detector surface used for measurement increases in size as the beam displacement increases and defocussing therefore occurs. It is therefore possible to compensate—at least to a large extent—for the effect of the reduced surface density for the measurement signal that normally occurs at short target-object distances.

In alternative embodiments, it may be sufficient when the optically active surface has an essentially constant expansion in the direction of a beam displacement as target-object distances decrease. Since, due soley to the inverse square law, the measurement signal intensity increases markedly as the target-object distances decrease, this effect may already be sufficient—depending on the design of the distance-measuring device, i.e., depending in particular on the focal distance of the collimation optics used for the detector—to compensate for the decrease in intensity of the measurement signal due to the defocussing that occurs. In a case such as this, it would be sufficient when the optically active surface of the detector would have an essentially constant expansion in the direction of a beam displacement as target-object distances decrease.

With the inventive shape of the photosensitive surface of its at least one detector, and, in particular, due to the inventive shape of the close-range element for a detector of this type, the claimed device for optical distance measurement therefore advantageously ensures that a reception signal of adequate intensity and, in particular, the most constant reception signal possible may be measured across a large measurement range.

It is therefore possible to expand the measuring range that is accessible to a measuring device of this type in a simple, reliable manner.

The photosensitive surface of the detector advantageously has a symmetry axis, which lies in the common plane of the optical axes of the transmission unit and the reception unit of the device. Given that the measurement beam that returns from the target object travels laterally in the common plane of the optical axes of the transmission unit and the reception unit as the object distance decreases, the detector will advantageously have an enlongated shape in this direction. In this manner, the dependence of the direction of the returning measurement signal on the distance of the measuring device from a target object is taken into account. The size of the photosensitive surfaces of the detector of the reception unit is selected such that a sufficient amount of signal, at close range in particular, still strikes the particular subregion of the detector.

This also advantageously makes it possible to account for the dependence of the intensity of the returning measurement signal on the distance of the measuring device from the target object.

In terms of the size of the surface of the detector and/or the size of the photosensitive surfaces of the detector, it should only be ensured that the active surface, i.e., the optically active surface of the detector struck by light from distant target objects, is great enough to detect the entire signal, if possible, in this case, since remote measurement objects result in a relatively weak detection signal. This is also a consequence of the inverse square law, on which the detected intensity is based.

The lateral expansion of the optically active surface of the detector should therefore be large enough that a sufficient amount of light from the immediate close range of detection still reaches the particular active detection area.

A further advantage of the claimed device is the fact that the electrical-capacitive properties of the detector of the measuring device are positively influenced, due to the inventive shape of the active detection surface. If the active detector surface were too large, the electrical capacitance of the detector would increase, and the response characteristic over time, or, as an equivalent, the frequency response of the measurement system, would no longer meet the necessary requirements of the time and frequency resolution of the measurement system.

A simple and economical design of an inventive device with the claimed detection surface results when the optically effective, i.e., photosensitive, detection surface is formed by partially covering a detection surface that was originally larger. To this end, e.g., a large surface detector may be provided with a light-proof layer, e.g., paint or deactivation in the regions that will not be used for detection, so that only the claimed design may be used as the effective, active detector surface. The light-proof regions may be created, e.g., by vapor deposition or painting a layer on the detector surface, depending on the wavelength of the measurement signal used, and in accordance with the detector that was selected. The claimed design of the active surface of the detector may also be realized using a simple mechanical mask or faceplate.

The inventive device for optically measuring distance may be advantageously realized by using a laser, in particular a laser diode, as the light source. Lasers and, in particular, laser diodes, are now available at favorable prices across the entire visible spectral range of electromagnetic waves. Due to their compact size and relatively high output powers, laser diodes are suited, in particular, for use in devices for optically measuring distance, in particular in hand-held devices of this type.

The inventive device for optically measuring distance therefore makes it possible to generate the most constant reception and detection signal possible over a large measuring range of distances between the device and a target object.

Further advantages of the inventive device are presented in the drawing below, and in the associated description of a few exemplary embodiments of the detector surface for an inventive device.

BRIEF DESCRIPTION OF THE DRAWINGS

Exemplary embodiments of the inventive device are shown in the drawing. The description, associated figures, and the claims contain numerous features in combination. One skilled in the art will also consider these features—and, in particular, the features of various exemplary embodiments—individually, and will combine them to form further reasonable combinations.

FIG. 4 shows a top view of an alternative embodiment of a detector for an inventive device, in a schematic depiction, FIG. 5 shows a further embodiment of the photosensitive surface of the detector of an inventive device, in a schematic illustration, FIG. 6 shows a further embodiment of the photosensitive surface of the detector of an inventive device, in a schematic illustration.

DETAILED DESCRIPTION OF THE EXEMPLARY EMBODIMENTS

Figure 1:
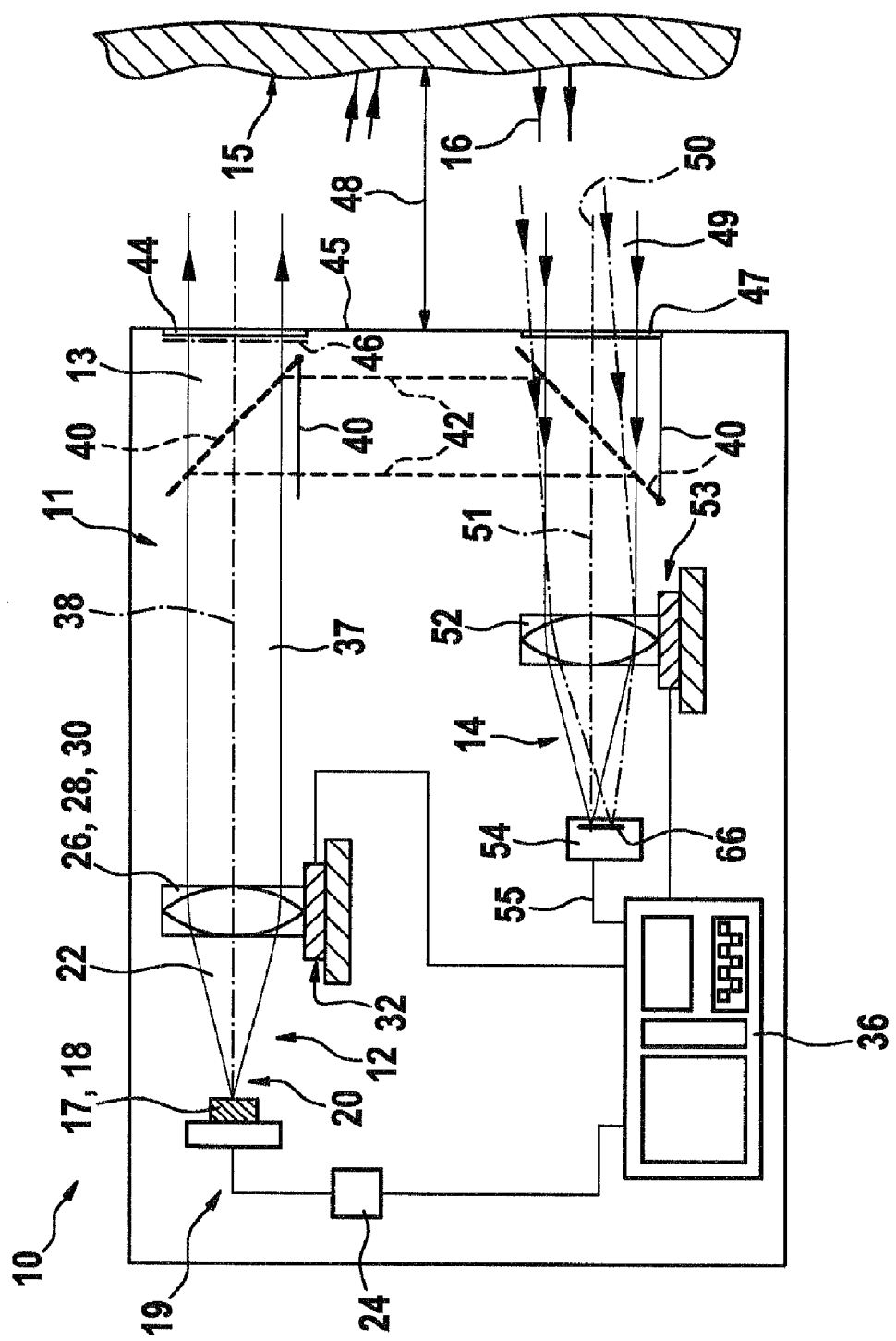
FIG. 1 shows a schematicized view of an exemplary embodiment of an inventive device for optically measuring distance.

FIG. 1 is a schematic view of an inventive device for optically measuring distance, including the most important components, whose function will be described. Inventive device 10 includes a housing 11, in which a transmission device 12 for generating a measurement signal 13, and a reception device 14 for detecting measurement signal 16 returning from a target object 15 are located.

Transmission device 12 includes a light source 17, which is realized as a semiconductor laser diode 18 in the exemplary embodiment shown in FIG. 1. It is also possible to use other light sources in the inventive device. Laser diode 18 emits a laser beam 20 in the form of a light bundle 22 that is visible to the human eye.

Laser diode 18 is operated via a control device 24, which modulates electrical input signal 19 of diode 18 using appropriate electronics. Via a modulation of the diode current carried out in the manner, it is ensured that optical measurement signal 13—which is used to measure distance—is also modulated in a desired manner.

Laser beam bundle 20 then passes through collimation optics 26 designed as a lens 28, which is depicted simply as a single lens 30 in FIG. 1. In this exemplary embodiment, lens 28 is optionally located on an adjustment device 32, which serves basically to change the position of the lens in all three spacial directions, e.g., for adjustment purposes.

As an alternative, collimation optics 26 may be a component of laser diode 18, or they may be fixedly connected therewith.

After passing through lens 28, an, e.g., amplitude-modulated signal 13 results in the form of a parallel light bundle 37, which propagates along optical axis 38 of transmission unit 12, as depicted schematically in FIG. 1. A preferably switchable beam deflector 40 is also located in transmission branch 12 of the inventive device that makes it possible to redirect measurement signal 13 to reception unit 14 of device 10 directly, i.e., inside the device, and to avoid a target object. In this manner, a reference path 42 inside the device is created, which may be used to calibrate or compensate for the measurement system.

When a distance measurement is carried out using the inventive device, measurement beam 13 leaves housing 11 of the inventive device via an optical window 44 in front wall 45 of device 10. The opening of the optical window may be secured, e.g., with a shutter 46. To perform the measurement, measuring device 10 is pointed at a target object 15, whose distance 48 from the measuring device is to be determined. Signal 16, which is reflected or scattered on target object 15, forms a returning ray bundle 49 or 50, a certain portion of which returns to measuring device 10.

Returning measurement radiation 16 is coupled into the measuring device through an entrance window 47 in front side 45 of device 10. In the exemplary embodiment shown in FIG. 1, measurement radiation 16 is deflected to reception optics 52.

Two returning measurement beam bundles 49 and 50 for two different target object distances 48 are sketched in FIG. 1, as an example and for purposes of illustration. For large object distances—with "large" in this case meaning large compared with the focal distance of reception optics 52—, signal 16 that is returning from the target object enters parallel to optical axis 51 of reception device 14. In the exemplary embodiment depicted in FIG. 1, this case is represented by measurement beam bundle 49. As the object distance decreases, returning signal 16 that enters the measuring device becomes increasingly slanted relative to axis 51 of reception unit 14, due to a parallax. Beam bundle 50 is drawn in FIG. 1 as an example of a returning measurement beam bundle of this type located within close range of the distance-measuring device.

Reception optics 52, which are also depicted only schematically as a single lens in the exemplary embodiment in FIG. 1, collimates returning measurement signal 16 and focuses its beam bundle on photosensitive surface 66 of a reception detector 54. Detector 54 includes—in order to detect the optical measurement radiation—at least one photodiode, e.g., a PIN diode, an APD (Avalanche Photo Diode), or at least one CCD chip, as photosensitive element 66. Of course, other surface detectors known to one skilled in the technical art may also be used as reception detectors. The surface detector is typically oriented such that its active photosensitive surface 66 is perpendicular to the optical axis of the reception branch. The incident optical signal is converted by reception detector 54 into an electrical signal 55, and it is sent to the inventive device for further evaluation in an evaluation unit 36. The exact embodiment of the shape of photosensitive surface 66 of the detector will be described in greater detail in conjunction with FIGS. 3 through 9.

Reception optics 52—which are also mounted on adjustment device 53 in the exemplary embodiment in FIG. 1, but is not limited thereto—are located approximately at the distance of their focal width away from active surface 66 of the detector, so that incident radiation arriving from a target object located far away from the measuring device is focused essentially on the detector or its active photosensitive surface.

When the distances from the target object are small, it should be noted, however, that the image position of the measurement spot that is reflected or scattered on the target object is located increasingly further away from the focal point of the reception lens. For example, as the distance between the target object and the measuring device decreases, the returning measurement beam travels increasingly further away from the optical axis of the reception device, thereby deviating more and more from the optical axis of the transmission device. In addition, the returning measurement beam bundle is no longer focused exactly on the detector surface, due to the changed imaging conditions on the reception lens. As the target object distance decreases, the size of the measurement spot on the detector surface increases.

Additional components located in the measuring device that are not related to what is required to understand the inventive device will not be discussed further in this context. It should merely be noted that the measuring device also includes a control and evaluation unit 36, of course.

Figure 2:
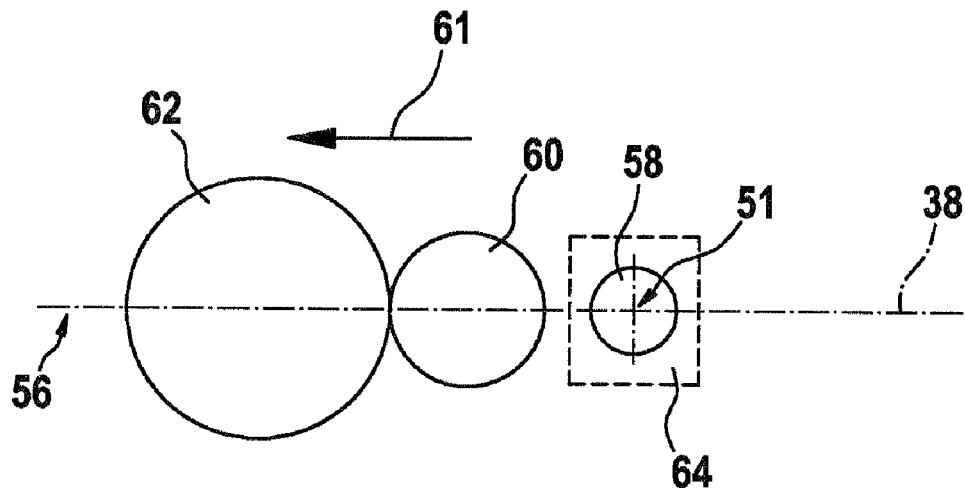
FIG. 2 shows a schematicized depiction of the variation of the measurement beam in the detection plane when the distance of the object to be measured varies.

The relationships between the distance of the target object from the measuring device and the position and size of the measurement spot in the plane of detection and, therefore on the detector surface, are depicted schematically in FIG. 2 as an overview. FIG. 2 shows a top view of a detector surface 64 per the related art in the direction of view of measurement signal 16, which is returning from the measurement object. Reference numeral 56 labels the common plane of optical axis 38 of transmission unit 12 and optical axis 51 of reception unit 14. Measurement spot 58 of returning radiation 16 for very large object distances is located on optical axis 51 of reception unit 14 and is focused on surface 64 of the detector, forming a small spot. Since detector 54 is located approximately at the distance of the focal width of reception optics 52, light that comes from infinity, optically speaking, is focused directly on the detector surface, due to the principles of optical imagery. To illustrate the relationships, a "classical" detector surface 64 of a detector per the related art is shown as a dashed line in FIG. 2.

As distance 48 of measuring device 10 from target object 15 decreases, returning signal 16 strikes reception lens 52 at an increasing slant, so that the measurement spot on the detector surface also travels in the direction of arrow 61 in FIG. 2. Measurement spot 60 for a short object distance 48 of target object 15 from measuring device 10, which is also sketched in FIG. 2, has therefore traveled away from optical axis 51 of the reception device, and it is greatly enlarged in terms of its expansion, in particular its lateral expansion.

When measurement distance 48 of measurement object 15 from the measuring device is very short, a measurement spot 62 of returning measurement signal 16 appears in the detector plane, which is also markedly increased in size and also appears further away from optical axis 51 of reception unit 14. A displacement of this type of the measurement spot to be detected as a function of distance 48 between a measurement object 15 and measuring device 10 may result—for very short object distances, and with devices per the related art—in returning signal 16 no longer striking active surface 64 of measurement receiver 54. In the situation depicted in FIG. 2, this is the case, e.g., for measurement signals that generate a measurement spot 60 or 62 in the plane of detection, since, in this case, returning signal 16 no longer strikes the active detection surface, as indicated by surface 64 of a "classical" measurement receiver shown in FIG. 2 using a dashed line.

To account for the variation in size and position of the measurement spot in the detection plane of reception unit 14, active photosensitive surface 66 of inventive detector 54 is designed accordingly and will be described below using a number of exemplary embodiments, which are not intended to be final.

Figure 3:
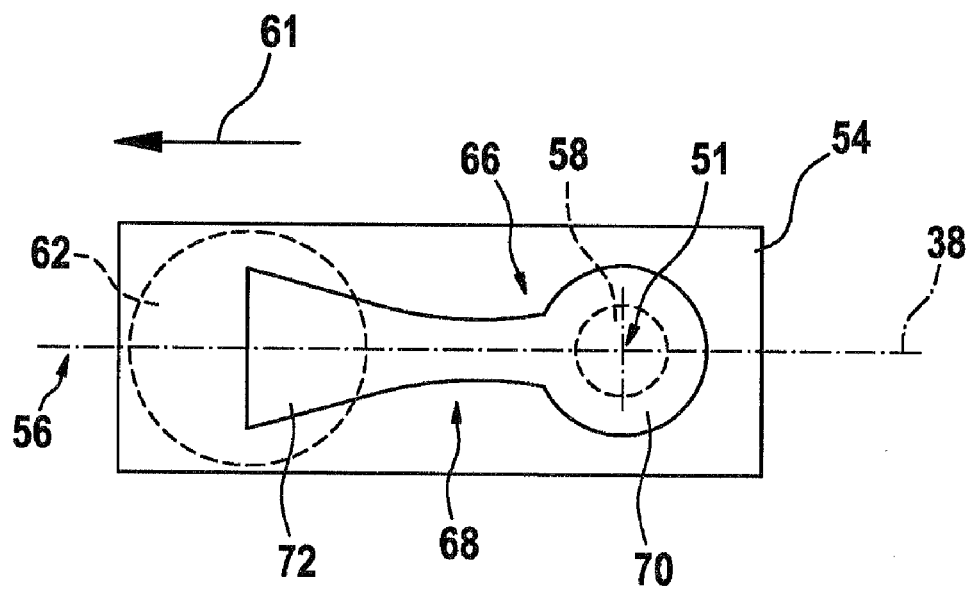
FIG. 3 shows a top view of the detector surface of an inventive device.

FIG. 3 shows a first exemplary embodiment of photosensitive surface 66 of a detector of the inventive device. Detector 54 of reception unit 14, which is depicted symbolically as a frame in FIG. 3 and FIGS. 4 through 9, which will be explained below, includes—in this case—a first region 70, whose photosensitive surface serves primarily to detect measurement signals that return from a remote measurement object 24. This first photosensitive region 70 is designed such that light that returns from a remote target object and is depicted in the detection plane reaches the detector and/or photosensitive surface 66 of detector 54 as completely as possible. To illustrate this, measurement spot 58 of a measurement beam 49 for large object distances is shown once more in FIG. 3. Active surface 70 therefore advantageously has a lateral expansion in the detection plane such that it ensures that measurement spot 58 of measurement radiation 16 or 49 returning from a remote target object of this type is detected in entirety. A direction in the detection plane that is perpendicular to the measurement signal direction is the lateral direction in this case. The dimensions of photosensitive surfaces 70 should therefore be essentially the same or slightly larger than the dimensions of a measurement spot 58 for very large object distances, as shown in FIG. 3. Photosensitive region 70 may be designed circular in shape, as shown in FIG. 3, or it may be rectangular or have any other shape. It should be ensured, however, that as much light as possible from the large target-object distance may strike photosensitive surface 70.

In the embodiment shown in FIG. 3, detector 54 includes a second photosensitive region 72, which is close-range element 68 of detection surface 66, and which serves, in particular, to receive and detect measurement signal components as target-object distances decrease. Second region 72 of photosensitive surface expands in the region of the impact points of measurement beams that return from a remote target object, so the close-range element in this region has a larger photosensitive surface. Given that the photosensitive surface of the detector increases in the direction perpendicular to the beam displacement as target-object distances decrease, and this surface expands in the direction, in particular, that is lateral to the direction of beam displacement, the effect of the defocusing of the returning measurement beam in the detector plane is accounted for. The effective detector surface used for measurement purposes becomes larger as the target-object distances decrease. As a result, the effect of reduced surface density for the measurement signal that normally results at short target-object distances may be compensated for at least to a large extent.

Second region 72 and/or close-range element 68 formed by this region has an elongated shape in beam-displacement direction 61, i.e., the extension of photosensitive surface 72 is greater in direction 61 than it is in the direction perpendicular thereto.

Photosensitive subregions 70 and 72 of detector 54 together form photosensitive or optically active surface 66 of the detector and, as shown in the example in FIG. 3, may be designed collectively as a single photosensitive surface. As an alternative, it is possible to design subregion 70 and 72 of photosensitive surface 66 of detector 54 separately from each other, and, as an option, to also control them electrically separately from each other. In this case, the subregions adjoin each other directly in order to provide a continual photosensitive surface in the direction of the beam displacement as a target-object distance decreases.

As mentioned above, the measurement signal travels laterally in the detector plane, and defocussing takes place with biaxial systems, which are usually adjusted for a large measurement distance. This results in an increased beam diameter of the measurement signal in the detection plane, as shown in FIG. 2. This is associated with a decrease in the measurement signal intensity per surface, which, depending on the design of the measuring device, is only partially compensated for by the greater measurement signal intensity due to the shorter distance to the target object.

The reduced energy surface density and/or intensity of the measurement signal on the detector results in an increased signal-to-noise ratio, thereby ultimately limiting the scope of application of a measurement system of this type. The inventive design of photosensitive detector surface 66 and, in particular, the inventive shape of close-range element 68 take this behavior into account in FIG. 3.

For very large object distances 48 between target object 15 and measuring device 10, measuring spot 58—as described above—comes to rest entirely on photosensitive subregion 70. If—as object distance 48 decreases—the measurement spot now travels away from original reception axis 51, in the direction of arrow 61, then the diameter and/or the lateral expansions of the measurement spot increase, as illustrated in FIG. 2.

Given a small measurement distance 48 between a measurement object 15 and measuring device 10, with which the measurement spot travels further in the detection plane in the direction of arrow 61 in FIG. 3, photosensitive surface 72 of close-range element 68 also increases accordingly, so that a greater proportion of signal from measurement signal spot 62—which is also increasing in size—may be detected and evaluated. In this manner it is possible to also markedly increase the signal-to-noise ratio for short object distances, and, therefore, to expand the distance range that is accessible by the measuring device.

Alternative embodiments of photosensitive surface 66 of detector 54 of an inventive distance-measuring device are depicted in FIGS. 4 through 6. For clarity, measurement spots 58 and 62 are not shown in these illustrations.

A similarity shared by all three embodiments presented in FIGS. 4 through 6 is that close-range element 68 includes a photosensitive and/or optically active surface 72, which expands at least partially in the direction that is orthogonal to direction 61 of a beam displacement for decreasing target-object distances 48. This expansion may be, e.g., linear, as shown in FIG. 5, or it may be over-proportional, as shown in FIG. 4. Within the framework of the present invention, a close-range element with a photosensitive surface 72, as shown in FIG. 6, in the case of which photosensitive surface 72 expands first, in order to attain a constant lateral expansion in direction 61 of beam displacement as target-object distances decrease, is also understood to be a photosensitive surface that expands at least partially.

Since the detector surface may only be finite in size, of course, and must therefore also be closed, a range results, e.g., for close-range element 68 as embodied in FIG. 4, in which surface 72 expands no further and, in fact, constricts, in order to limit the detector surface. This edge region—shown on the left in FIG. 4—of photosensitive surface 72 serves solely to limit—as is necessary—the photosensitive surface of the close-range element and does not contradict the basic expansion of the surface according to the inventive idea. This physical need for a limited detector surface is accounted for in that, within the framework of the claimed subject, it is discussed that the detection surface of optical close-range element 68 is elongated in direction 61 of a beam displacement for decreasing target-object distances 48, and it expands at least partially in the direction orthogonal thereto, or has an expansion that is essentially constant. Within the framework of the disclosure, it could also be discussed that this surface essentially expands or has an essentially constant expansion. The overall impression, that the photosensitive surface of optical close-range element 68 as a whole has a corresponding expansion in the direction orthogonal to beam-displacement direction 61, remains unaffected by the necessary limitation of the photosensitive surface. The same applies, in the same sense, for any modulations in the boundary lines of the photosensitive surfaces.

Depending on the design of the measuring device, the effect of the inverse square law and the effect of the more or less poor focusing should be weighed against each other, and the optimized shape of entire photosensitive surface 66 should be found, and, in particular, an optimized shape of photosensitive surfaces 72 of the close-range element should be found. Depending on the specific design of the measuring device, one or the other special design of close-range element 68 may be an advantage.

Figure 7:
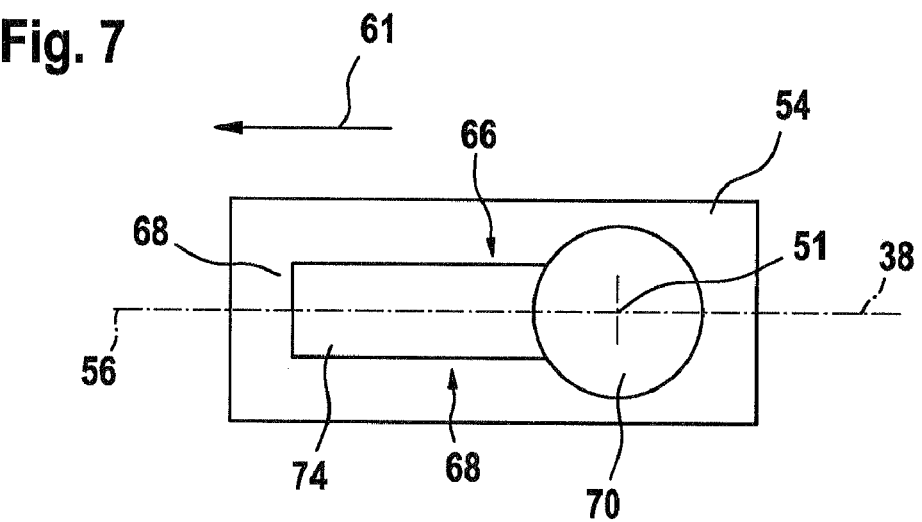
FIG. 7 shows a further embodiment of the photosensitive surface of the detector of an inventive device, in a schematic illustration.
Figure 8:
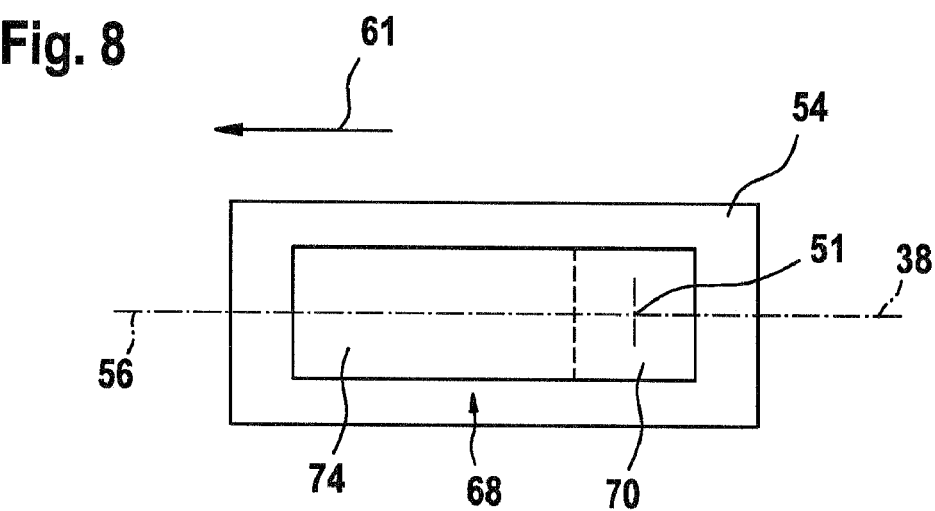
FIG. 8 shows a further embodiment of the photosensitive surface of the detector of an inventive device, in a schematic illustration.

FIG. 7 and FIG. 8 show further exemplary embodiments of inventive photosensitive surfaces 66 of a detector 54. In direction 61 of a beam displacement for decreasing target-object distances 48, the surface detector also has an elongated shape overall in this case. That is, the expansion in the direction of the travel of the measurement signal is greater—markedly greater, in particular, than it is in the orthogonal direction, i.e., in the lateral direction.

In this case, detector 54 also includes a first region, whose photosensitive surface 70 serves primarily to detect measurement signals that return from a remote measurement object. This first photosensitive region 70 is designed such that light that returns from a remote target object and is depicted in the detection plane reaches the detector and/or photosensitive surface 66 of detector 54 as completely as possible. In the exemplary embodiment shown in FIG. 7, photosensitive region 70 is designed circular in shape; it may also be rectangular, triangular, or have any other shape. It should be ensured, however, that as much light as possible from the large target-object distance may strike the photosensitive surface.

In the embodiment shown in FIG. 7, detector 54 also includes a second photosensitive region 74, which serves as close-range element 68 and, in particular, serves to receive and detect measurement signal components as target-object distances decrease.

Second region 74 and/or close-range element 68 formed by this region also has an elongated shape in beam-displacement direction 61, which, in the exemplary embodiment shown in FIG. 7, has a constant lateral extension, however. A shape of this type is useful in particular when the effects of the inverse square law and the effect of the more or less poor focussing essentially remain in balance.

Subsurfaces 70 and 72 may be interconnected, in particular being interconnected as a single piece. They may also be designed separate from each other, and it may even be possible to control them separately. Every embodiment, however, involves a single—continual, in particular—photosensitive surface 66, which is composed of subsurfaces 70 and 72.

FIG. 8 shows a variant of a close-range element with a constant lateral extension in beam displacement direction 61. In this embodiment, overall photosensitive surface 66 of the detector has a rectangular shape, for example. Subsurfaces 70 and 74 are not delineated from each other, and they blend with each other without transition. A dot-dash separating line 80—which does not exist in the device, of course—is shown in the simplified, schematic illustration in FIG. 8, merely to illustrate the different regions that are used for different object distances.

Figure 9:
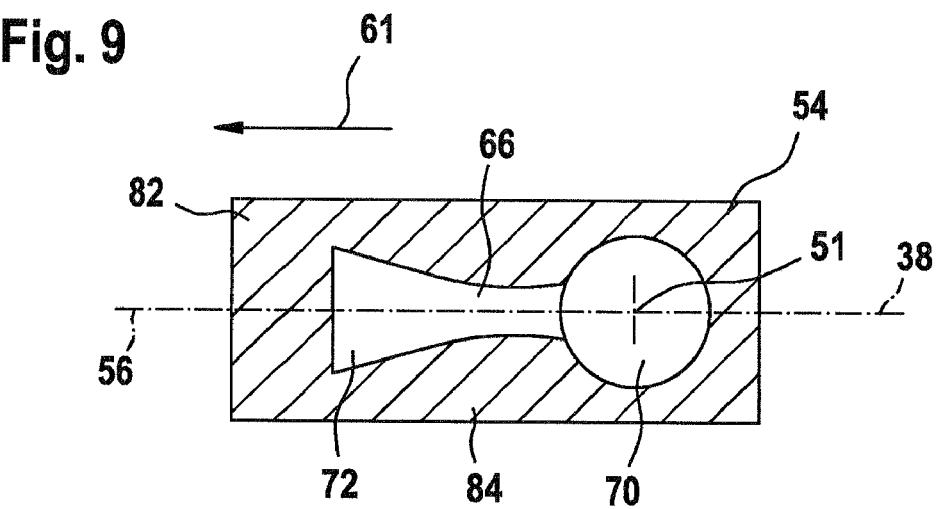
FIG. 9 shows a depiction of a detector surface, which serves to explain the design of the photosensitive surface of the detector, in a simplified, schematic illustration.

FIG. 9 shows a possible realization of the individual exemplary embodiments of inventive detector 54. While, in the exemplary embodiments shown in FIGS. 2 through 8, the effective, i.e., photosensitive surface 66 of detector 54 is the same as the entire detector surface, in the exemplary embodiment shown in FIG. 9, the optically active, i.e., photosensitive detector surface 66 is derived from a detector surface 82 that was originally larger. To this end, the optically sensitive surface of a semiconductor detector, which includes, e.g., a rectangular detection surface, is covered with an optically opaque layer 84 in certain regions, thereby deactivating the semiconductor detector in these coated regions. Only an uncoated subsurface 66 of the semiconductor therefore remains photosensitive. This active subsurface 66 may be provided with any desired shape in the manufacturing process, even including the shapes of detector surfaces 66 shown in FIGS. 2 through 9. To produce this light-proof layer, a metallic layer may be vapour-deposited at the desired points of the original detection surface. The claimed shape of the active surface of the detector may also be realized using a simple mechanical mask or faceplate. Other optical deactivation measures for the semiconductor surface known to one skilled in the art may also be used for this purpose, of course, so further details of a possible manufacturing process will not be discussed at this point.

A common feature of all of the designs shown in the exemplary embodiments is that the active, i.e., photosensitive surface of the close-range element of the inventive detector does not taper in the direction of the beam displacement due to the parallax of decreasing target-object distances. The exact shape of the change of the detector surface as the distance from the optical axis of the transmission device increases depends, e.g., on the desired measurement range in which the inventive measuring device is intended to operate. The exact geometry of the device and the optical imaging conditions in the reception branch must also be taken into account when optimizing the size and shape of the photosensitive regions.

The inventive device is not limited to the exemplary embodiments presented in the description and the figures.

In particular, the inventive device is not limited to the shapes and numbers of individual photosensitive subregions of the detector. The change in the lateral expansion of the active detector surface need not take place in a continual manner. Instead, it may be realized as discrete, e.g., individual stages.

What is claimed is:

1. A device for optically measuring distance, comprising:
a transmission unit (12) that includes a light source (17, 18) for emitting optical measurement radiation (13, 20, 22) toward a target object (15); and
a receiving unit (14) that is located a distance away from the optical axis (38) of the transmission unit (12) and includes at least one optical detector (54) for receiving optical radiation (16, 49, 50) reflected by the target object (15),
wherein the detection surface (66) of the detector (54) includes an optical close-range element (68) whose optically active surface (72, 74) is elongated in the direction (61) of a beam displacement for decreasing target-object distances (48) and expands, at least partially, in the direction orthogonal thereto, or it expands in an essentially constant manner.

2. The device as recited in claim 1, wherein the photosensitive surface (66, 70, 72, 74) of the detector (54) has a symmetry axis located in the common plane (56) of the optical axes (38, 51) of the transmission unit and the receiving unit.

3. The device as recited in claim 1, wherein the expansion of the photosensitive surface (66, 70, 72, 72) of the detector (54) is at least so great that a measurement spot (58) of the returning radiation (16, 49) from a target object (15) at a large object distance is detected in entirety.

4. The device as recited in claim 1, wherein the expansion of the photosensitive surface (66, 70, 72, 74) of the detector (54) in the direction perpendicular to the optical axis (51) of the receiving unit (14) is at least so great that the measurement beam (50) returning from a target object (15) at close range still strikes the photosensitive surface (72, 74) at least partially.

5. The device as recited in claim 1, wherein the active, photosensitive surface (66, 70, 72, 74) of the detector (54) is formed by partially covering a larger, optically sensitive detector surface (82).

6. The device as recited in claim 5, wherein the active, photosensitive surface (66, 70, 72, 74) of the detector (54) is formed by partially applying an optically opaque layer (84) on the originally larger, optically sensitive detector surface (72).

7. The device as recited in claim 1, wherein the light source (17, 18) is a laser, in particular a laser diode (18).

8. The device as recited in claim 7, wherein the light source (17, 18) emits radiation in the wavelength range of the spectrum of electromagnetic waves that is visible to the human eye.

9. A device for optically measuring distance, comprising:
a transmission unit (12) that includes a light source (17, 18) for emitting optical measurement radiation (13, 20, 22) toward a target object (15); and
a receiving unit (14) that is located a distance away from the optical axis (38) of the transmission unit (12) and includes at least one optical detector (54) for receiving optical radiation (16, 49, 50) reflected by the target object (15),
wherein the detection surface (66) of the detector (54) includes an optical close-range element (68) whose optically active surface (72, 74) is elongated in the direction (61) of a beam displacement for decreasing target-object distances (48) and expands, at least partially, in the direction orthogonal thereto.

10. The device for optically measuring distance as recited in claim 1 or 9, wherein the device is a hand-held device.

* * * * *